United States Patent
Tomii

(10) Patent No.: US 8,755,100 B2
(45) Date of Patent: Jun. 17, 2014

(54) IMAGE FORMING APPARATUS FOR MEASURING A COLOR OF A FORMED IMAGE

(71) Applicant: Canon Kabushiki Kaisha, Tokyo (JP)

(72) Inventor: Hiroshi Tomii, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/648,936

(22) Filed: Oct. 10, 2012

(65) Prior Publication Data

US 2013/0094040 A1    Apr. 18, 2013

(30) Foreign Application Priority Data

Oct. 14, 2011    (WO) .................. PCT/JP2011/073606

(51) Int. Cl.
*G03F 3/08*    (2006.01)
*G03G 15/20*    (2006.01)

(52) U.S. Cl.
USPC .............................. 358/518; 399/67; 399/69

(58) Field of Classification Search
None
See application file for complete search history.

(56) References Cited

U.S. PATENT DOCUMENTS

| | | | |
|---|---|---|---|
| 5,001,519 A * | 3/1991 | Saito | 399/69 |
| 6,795,661 B2 * | 9/2004 | Kanesawa et al. | 399/69 |
| 2004/0037578 A1* | 2/2004 | Kurita et al. | 399/67 |
| 2010/0086201 A1* | 4/2010 | Muto et al. | 382/162 |

FOREIGN PATENT DOCUMENTS

| | | |
|---|---|---|
| JP | 2001-349778 A | 12/2001 |
| JP | 2004-086013 A | 3/2004 |
| JP | 2004-145085 A | 5/2004 |
| JP | 2006-267597 A | 10/2006 |
| JP | 2006-292934 A | 10/2006 |
| JP | 2010-005996 A | 1/2010 |
| JP | 2010-145606 A | 7/2010 |
| JP | 2011-186087 A | 9/2011 |

* cited by examiner

*Primary Examiner* — Barbara Reiner
(74) *Attorney, Agent, or Firm* — Canon USA Inc IP Division

(57) ABSTRACT

To suppress an effect caused by a thermochromism phenomenon in which the color of an image whose color is to be measured changes depending on temperature and to accurately detect the color of the image whose color is to be measured.
An image forming apparatus includes a color sensor that measures the color of an image fixed onto recording paper downstream of a fixing unit in a direction in which the recording paper is carried. The image forming apparatus corrects a result of the measurement of the color obtained by the color sensor in such a way as to suppress an effect due to the temperature of the recording paper at the time of the measurement of the color on the recording paper.

8 Claims, 7 Drawing Sheets

FIG. 8A

| 60°C | | | 25°C : NORMAL TEMPERATURE ENVIRONMENT | | |
|---|---|---|---|---|---|
| L | a | b | L | a | b |
| 54.7 | −33.9 | −48.0 | 54.6 | −32.9 | −48.9 |
| 47.1 | 71.4 | −4.4 | 47.9 | 72.0 | −3.3 |
| 91.2 | −5.9 | 94.5 | 91.2 | −6.4 | 94.4 |
| 20.2 | −0.1 | 0.4 | 21.0 | −0.1 | 0.4 |
| 48.4 | 63.2 | 51.8 | 49.1 | 63.4 | 52.2 |
| 49.7 | −62.9 | 33.5 | 49.6 | −62.5 | 33.2 |
| 20.9 | 25.4 | −41.5 | 21.0 | 25.4 | −40.9 |
| ⋮ | ⋮ | ⋮ | ⋮ | ⋮ | ⋮ |

FIG. 8B

| DETECTED TEMPERATURE [°C] | CONVERSION TABLE |
|---|---|
| 80 − | $A_{T=80}$ |
| 70 − | $A_{T=70}$ |
| 60 − | $A_{T=60}$ |
| 50 − | $A_{T=50}$ |
| 40 − | $A_{T=40}$ |
| 30 − | $A_{T=30}$ | though
IMAGE FORMING APPARATUS FOR MEASURING A COLOR OF A FORMED IMAGE

TECHNICAL FIELD

The present invention relates to an image forming apparatus having a color measurement function.

BACKGROUND ART

Qualities of an image (hereinafter referred to as image qualities) of an image forming apparatus include graininess, in-plane uniformity, character quality, and color reproducibility (including color stability). Today, when multi-color image forming apparatuses have become popular, it is sometimes said that the most important image quality is color reproducibility.

Humans have memories relating to expected colors (especially human skins, blue skies, metals, and the like) based on experience, and when the respective allowable ranges of the colors are exceeded, the colors feel strange. These colors are called memory colors, and the reproducibility thereof is now often required when a photograph or the like is output.

Not only in photographic images but also in document images, there are increasing demands for the color reproducibility (including stability) of an image forming apparatus from those such as office users who feel a difference from a color displayed on a monitor to be strange and graphic art users whose pursue color reproducibility in CG images.

Therefore, in order to meet the demands for color reproducibility from the users, an image forming apparatus has been proposed that reads an image whose color is to be measured formed on recording paper using a color sensor provided along a carrying path for the recording paper (for example, refer to PTL 1).

In this image forming apparatus, the image whose color is to be measured is formed on the recording paper using toner and feedback is provided for processing conditions such as light exposure and developing bias on the basis of a result of the reading, by the color sensor, of the image whose color is to be measured, in order to make it possible to reproduce a certain density, tone, and color.

CITATION LIST

Patent Literature

PTL 1 Japanese Patent Laid-Open No. 2004-086013

However, in the invention disclosed in PTL 1, because the color sensor is provided close to a fixing apparatus along the carrying path, a phenomenon called "thermochromism", in which the chromaticity of the image whose color is to be measured, which is a target of the measurement, changes depending on temperature poses a problem. This is a phenomenon caused at times such as when a molecular structure that forms a color material such as toner or ink is changed by "heat".

Here, in order to measure the color of the image whose color is to be measured inside the image forming apparatus, it is necessary that the color material has been disposed on the recording paper and mixing of colors has been completed. In the case of an image forming apparatus that uses ink as the color material, the color needs to be measured after being heated and dried by a drying apparatus. In the case of an image forming apparatus that uses toner as the color material, the color needs to be measured after the toner is heated and fused by a fixing apparatus. Therefore, the color sensor needs to be provided downstream of the drying apparatus or the fixing apparatus in a direction in which the recording paper is carried.

On the other hand, in order to configure an image forming apparatus in a compact manner, the length of the carrying path from the drying apparatus or the fixing apparatus to the color sensor needs to be as short as possible. Therefore, the recording paper and the color material heated by the drying apparatus or the fixing apparatus are undesirably not cooled to a normal temperature before being carried to the color sensor. In addition, the temperature of the recording paper undesirably becomes higher than the normal temperature due to an increase in the temperature of a member inside the image forming apparatus, such as a carrying guide for the recording paper, or the temperature of an atmosphere inside the image forming apparatus.

Thus, in an image forming apparatus having a color sensor inside, a result of color measurement different from chromaticity in a normal environment (in a normal temperature environment) can be undesirably obtained due to the effect of thermochromism.

Therefore, an object of an example of the present invention is to provide an image forming apparatus that can suppress the effect of a thermochromism phenomenon, which changes the chromaticity of an image whose color is to be measured depending on temperature, and that can accurately detect the chromaticity of the image whose color is to be measured.

SUMMARY OF INVENTION

In order to achieve the above object, an image forming apparatus according to an example of the present invention includes an image forming unit configured to form a plurality of images whose colors are to be measured on recording paper using color materials, a fixing unit configured to fix the plurality of images whose colors are to be measured onto the recording paper by heating the plurality of images, a color measurement unit configured to measure the colors of the images fixed onto the recording paper downstream of the fixing unit in a direction in which the recording paper is carried, and a correction unit configured to correct results of the measurement of the colors obtained by the color measurement unit in such a way as to suppress an effect due to temperature of the recording paper at a time of the measurement of the colors on the recording paper by the color measurement unit.

Further features of the present invention will become apparent from the following description of exemplary embodiments with reference to the attached drawings.

BRIEF DESCRIPTION OF DRAWINGS

FIG. 8A is a diagram illustrating a conversion table that uses direct mapping.

FIG. 8B is a diagram illustrating conversion tables that use direct mapping.

DESCRIPTION OF EMBODIMENTS (Image Forming Apparatus)

In the present embodiment, a method for solving the above problem will be described using a laser beam printer adopting an electrophotographic method. Here, for example, the electrophotographic method is adopted as a method for forming an image. However, examples of the present invention can be applied to an inkjet method and a sublimation method. This is because an example of the present invention is an effective invention for an image forming apparatus in which a thermochromism phenomenon, which changes the chromaticity of an object to be measured depending on temperature, can occur. In the case of the inkjet method, an image forming unit that forms an image on recording paper by ejecting ink and a fixing unit (a drying unit) that dries the ink are used. Note, in the description below, the word "chromaticity" is just being used to express color. A particular chromaticity value may be expressed in the L*a*b color space. Other color spaces may be used without going beyond the scope and spirit of the invention as recited in the claims. Also, the "chromaticity value" is equivalent to the "color value".

Figure 1:
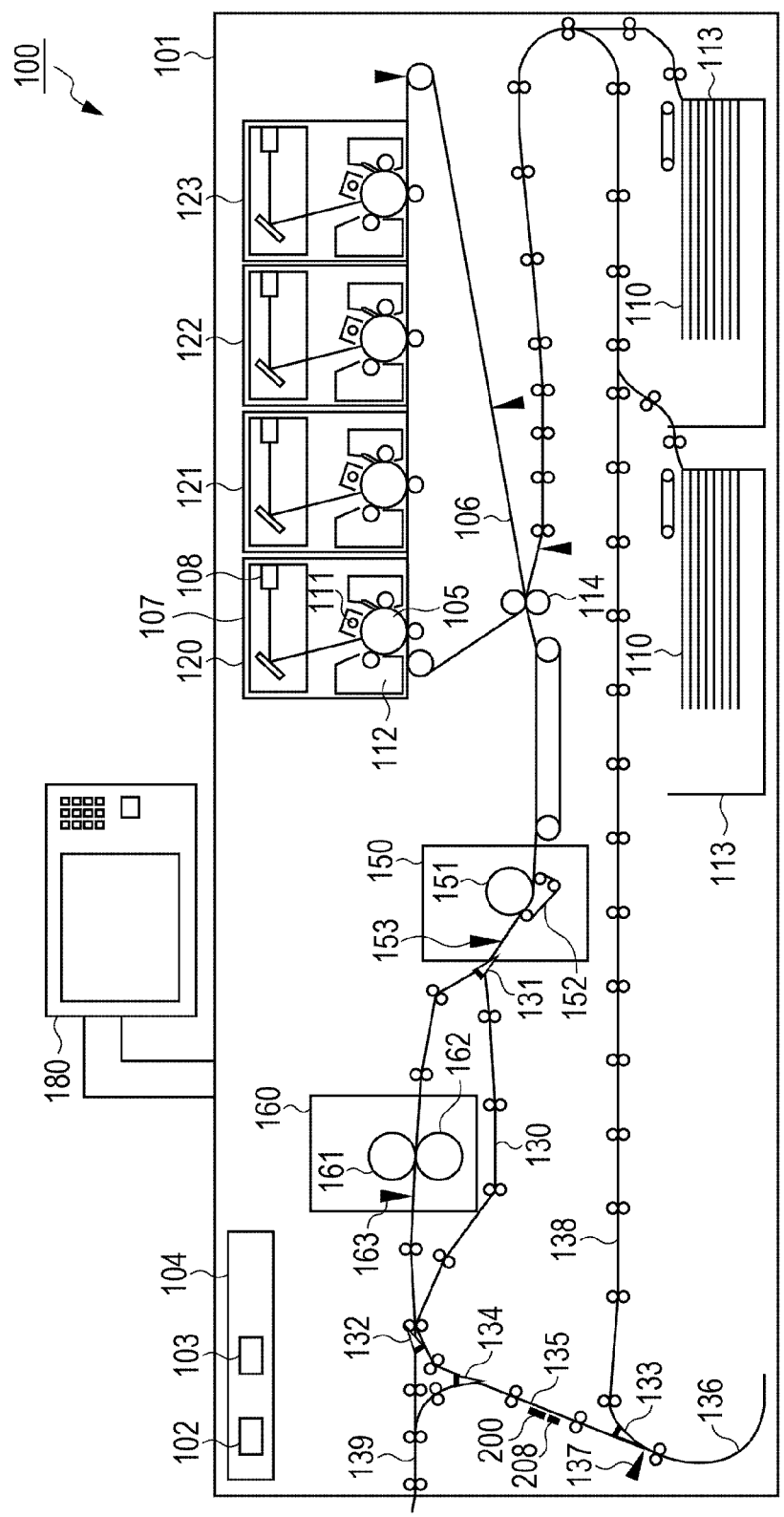
FIG. 1 is a cross-sectional view of the structure of an image forming apparatus 100.

FIG. 1 is a cross-sectional view of the structure of an image forming apparatus 100. The image forming apparatus 100 includes a chassis 101. The chassis 101 is provided with mechanisms for configuring an engine unit and a control board storage unit 104. In the control board storage unit 104, an engine control unit 102 that executes control relating to various print processing processes (for example, a paper feed process) by the mechanisms and a printer controller 103 are stored.

As illustrated in FIG. 1, four stations 120, 121, 122, and 123 corresponding to YMCK are provided in the engine unit. The stations 120, 121, 122, and 123 are image forming units that forms an image by transferring toner onto a recording paper 110. Here, YMCK is an abbreviation for yellow, magenta, cyan, and black. Each station is configured by substantially the same components. A photosensitive drum 105 is a type of image support and charged by a first charging unit 111 in such a way to have uniform surface potential. A latent image is formed on the photosensitive drum 105 by laser light output from a laser 108. A developing unit 112 forms a toner image by developing the latent image using a color material (toner). The toner image (visible image) is transferred onto an intermediate transfer body 106. The visible image formed on the intermediate transfer body 106 is transferred onto the recording paper 110 carried from a storage tray 113 by a transfer roller 114.

A fixing process mechanism according to the present embodiment includes a first fixing unit 150 and a second fixing unit 160 that fix the toner image transferred onto the recording paper 110 by heating and pressurizing the toner image. The first fixing unit 150 includes a fixing roller 151 that apply heat to the recording paper 110, a pressuring belt 152 that attaches the recording paper 110 to the fixing roller 151 using pressure, and a post-first fixing sensor 153 that detects completion of the fixing. These rollers are hollow rollers, each including a heater.

The second fixing unit 160 is arranged downstream of the first fixing unit 150 in a direction in which the recording paper 110 is carried. The second fixing unit 160 adds gloss to the toner image on the recording paper 110 fixed by the first fixing unit 150 and secures fixability. As with the first fixing unit 150, the second fixing unit 160 includes a fixing roller 161, a pressurizing roller 162, and a post-second fixing sensor 163. The recording paper 110 need not pass through the second fixing unit 160 depending on the type thereof. In this case, the recording paper 110 is carried along a carrying path 130 without passing through the second fixing unit 160 for the purpose of reducing the amount of energy consumption.

For example, when a setting has been made in which a large amount of gloss is added to an image on the recording paper 110 or when the recording paper 110 needs a large amount of heat to fix an image, such as when the recording paper 110 is thick paper, the recording paper 110 that has passed through the first fixing unit 150 is also carried to the second fixing unit 160. On the other hand, when the recording paper 110 is plain paper or thin paper and a setting has not been made in which a large amount of gloss is added, the recording paper 110 is carried along the carrying path 130 without passing through the second fixing unit 160. Whether the recording paper 110 is carried to the second fixing unit 160 or the recording paper 110 is carried without passing through the second fixing unit 160 is controlled by switching a flapper 131.

A carrying path switching flapper 132 is a guide member that guides the recording paper 110 to a discharge path 135 or to a discharge path 139 to the outside. Downstream of the second fixing unit 160 in the direction in which the recording paper 110 is carried, color sensors 200 and a temperature sensor 208 are provided that detect an image whose color is to be measured (hereinafter referred to as a patch image) on the recording paper 110. Four color sensors 200 are provided side by side in a direction perpendicular to the direction in which the recording paper 110 is carried and can detect four columns of patch images. When an operation unit 180 has issued an instruction of color detection, the engine control unit 102 executes density adjustment, tone adjustment, multi-dimensional color adjustment, or the like. The temperature sensor 208 as a temperature detection unit is a sensor for detecting the temperature of the recording paper 110.

A reverse sensor 137 is provided along the discharge path 135. A leading end of the recording paper 110 whose color has been measured by the color sensor 200 passes through the reverse sensor 137 and is carried to a reversing unit 136. When a trailing end of the recording paper 110 has been detected by the reverse sensor 137, the direction in which the recording paper 110 is carried is switched. A carrying path switching flapper 133 is a guide member that guides the recording paper 110 to a carrying path 138 for forming images on both sides or to the discharge path 135. A carrying path switching flapper 134 is a guide member that guides the recording paper 110 to the discharge path 139 to the outside. The recording paper 110 carried to the discharge path 139 is discharged to the outside of the image forming apparatus 100.

(Color Sensor)

Figure 2:
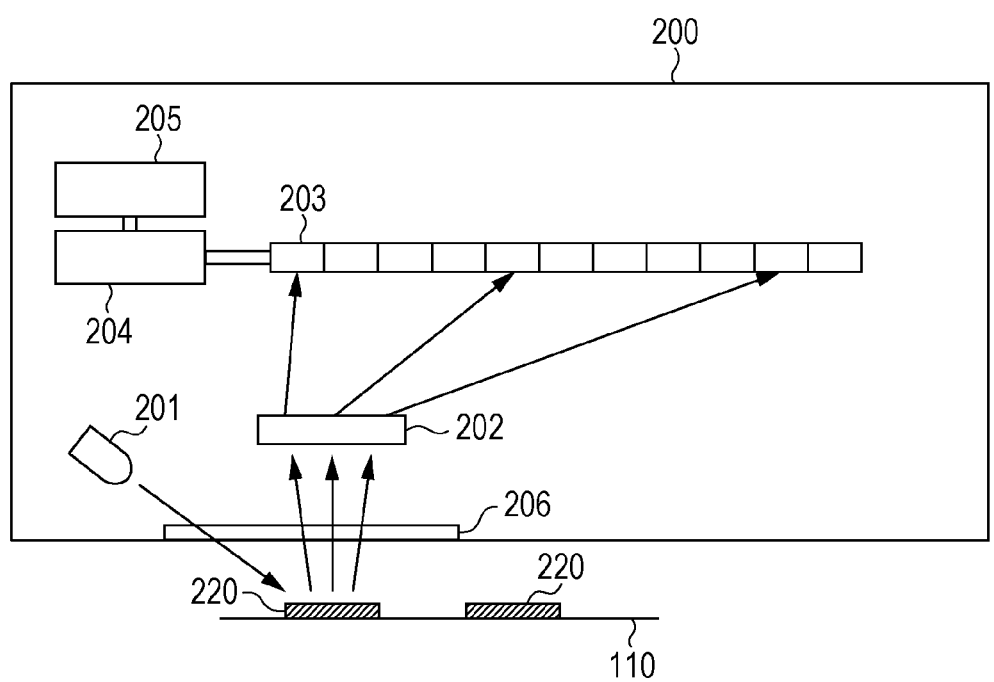
FIG. 2 is a diagram illustrating the structure of a color sensor 200.

FIG. 2 is a diagram illustrating the structure of the color sensor 200. In the color sensor 200, a white LED 201, a diffraction grating 202, a line sensor 203, an operation unit 204, and a memory 205 are provided. The white LED 201 is a light-emitting device that radiates light onto a patch image 220 on the recording paper 110. The diffraction grating 202 divides the light reflected from the patch image 220 in accordance with wavelengths. The line sensor 203 is a photodetector including n light-receiving elements that detect the light divided by the diffraction grating 202 in accordance with wavelengths. The operation unit 204 executes various operations using a light intensity value of each pixel detected by the line sensor 203.

The memory 205 saves various pieces of data used by the operation unit 204. The operation unit 204 includes, for example, a spectral operation unit that executes a spectral operation using light intensity values and a Lab operation unit that calculates Lab values. In addition, a lens 206 may be further provided that focuses the light radiated from the white LED 201 onto the patch image 220 on the recording paper 110 and that focuses the light reflected from the patch image 220 onto the diffraction grating 202.

(Profile)

The image forming apparatus 100 creates a profile from a result of detection of a patch image and forms an output image by converting an input image using the profile. As a profile that realizes excellent color reproducibility, an ICC profile, which is becoming popular in the market in these years, is used herein. However, an example of the present invention can be applied without the ICC profile. An example of the present invention can be applied to a CRD (Color Rendering Dictionary) adopted in PostScript Level 2 or later created by Adobe, a color separation table in Photoshop, or the like.

A user operates the operation unit 180 to request a process for creating a color profile when a component is to be replaced by a customer engineer, before a job in which color matching accuracy is required, when the user wishes to know the color of a final output in a conceptual phase of designing, or the like.

Figure 3:
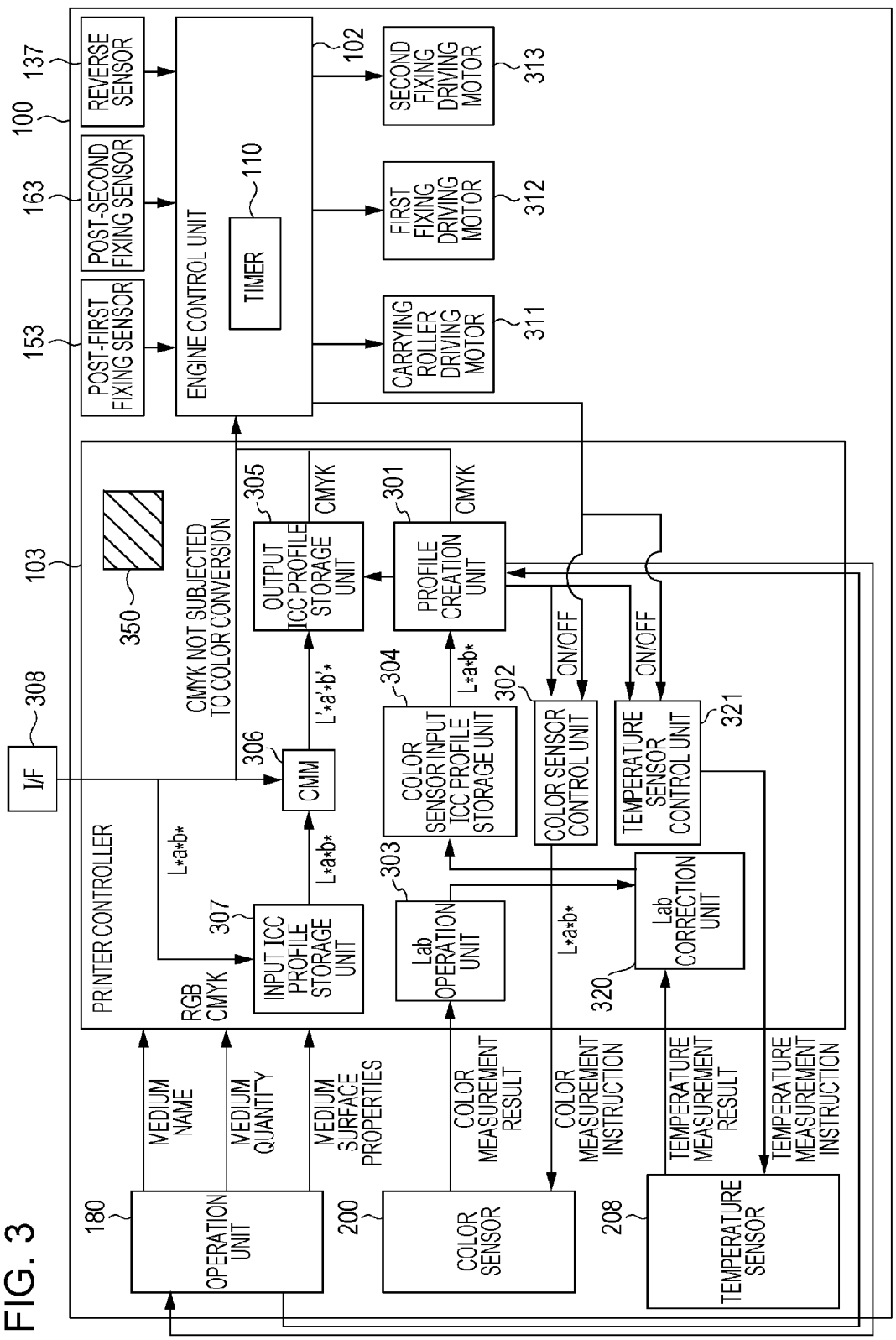
FIG. 3 is a block diagram illustrating the system configuration of the image forming apparatus 100.

The process for creating a profile is executed by the printer controller 103 illustrated in a block diagram of FIG. 3. The printer controller 103 includes a CPU and reads a program for executing a flowchart, which will be described later, from a storage unit 350 to execute the program. It is to be noted that, in FIG. 3, the inside of the printer controller 103 is represented by blocks in order to simplify processes executed by the printer controller 103.

When the operation unit 180 has received a profile creation instruction, a profile creation unit 301 outputs a CMYK color chart 210, which is an ISO 12642 test form, to the engine control unit 102 without passing through the profile. The profile creation unit 301 transmits a color measurement instruction to a color sensor control unit 302. The engine control unit 102 controls the image forming apparatus 100 in such a way as to cause the image forming apparatus 100 to execute processes such as charging, exposure, developing, transfer, and fixing. In doing so, an ISO 12642 test form is formed on the recording paper 110.

The engine control unit 102 controls a carrying roller driving motor 311 that drives carrying rollers for carrying the recording paper 110. In addition, the engine control unit 102 controls a first fixing driving motor 312 for driving the first fixing unit 150 and a second fixing driving motor 313 for driving the second fixing unit 160.

The color sensor control unit 302 controls the color sensor 200 in such a way as to cause the color sensor 200 to measure the color of the ISO 12642 test form. The color sensor 200 outputs spectral reflectance data, which is a result of the color measurement, to a Lab operation unit 303 of the printer controller 103. The Lab operation unit 303 converts the spectral reflectance data into L*a*b* data and outputs the L*a*b* data to a Lab correction unit 320.

A temperature sensor control unit 321 controls, in accordance with an on/off signal from the engine control unit 102, the temperature sensor 208 in such a way as to cause the temperature sensor 208 to detect the temperature of the recording paper 110. The Lab correction unit 320 corrects the L*a*b* data received from the Lab operation unit 303 in accordance with a result of the detection executed by the temperature sensor 208 and outputs the corrected L*a*b* data to the profile creation unit 301. It is to be noted that the Lab operation unit 303 may convert the spectral reflectance data into a CIE 1931 XYZ color system, which is a color space signal that does not depend on a device.

The profile creation unit 301 creates an output ICC profile on the basis of a relationship between the CMYK color signal output to the engine control unit 102 and the L*a*b* data input from the Lab operation unit 303. The profile creation unit 301 stores the created output ICC profile in an output ICC profile storage unit 305 instead of an output ICC profile stored in the output ICC profile storage unit 305.

The ISO 12642 test form includes a patch of CMYK color signals that cover a color reproducibility range that can be output by a general copying machine. Therefore, the profile creation unit 301 creates a color conversion table on the basis of a relationship between each color signal value and a measured L*a*b* value. That is, a conversion table from CMYK to Lab is created. On the basis of this conversion table, an inverse conversion table is created.

Upon receiving a profile creation command from a host computer through an I/F 308, the profile creation unit 301 outputs the created output ICC profile to the host computer through the I/F 308. The host computer can execute color conversion corresponding to the ICC profile using an application program.

(Color Conversion Process)

In color conversion using normal color output, an image signal input while assuming an RGB signal value or a standard printing CMYK signal value such as Japan Color input from a scanner section through the I/F 308a is transmitted to an input ICC profile storage unit 307 for external input. The input ICC profile storage unit 307 executes conversion from RGB into L*a*b* or from CMYK into L*a*b* in accordance with the image signal input from the I/F 308. An input ICC profile stored in the input ICC profile storage unit 307 is configured by a plurality of LUTs (lookup tables).

These LUTs are, for example, a one-dimensional LUT that controls the gamma of an input signal, a multi-dimensional color LUT that is called direct mapping, and a one-dimensional LUT that controls the gamma of generated conversion data. The input image signal is converted from a color space that depends on a device into L*a*b* data that does not device on a device using these LUTs.

The image signal converted into a chromaticity value in L*a*b* color space coordinates is input to a CMM 306. CMM is an abbreviation for color management control. The CMM 306 executes various types of color conversion. For example, the CMM 306 executes GAMUT conversion in which a mismatch between a color space read by the scanner section as an input device and a color reproducibility range output from the image forming apparatus 100 as an output device is mapped. In addition, the CMM 306 executes color conversion in which a mismatch (also referred to as a mismatch of color temperature setting) between the type of light source for input and the type of light source for observing an output is adjusted.

Thus, the CMM 306 converts the L*a*b* data into L'*a'*b'* data and outputs the L'*a'*b'* data to the output ICC profile storage unit 305. The profile created as a result of the color measurement is stored in the output ICC profile storage unit 305. Therefore, the output ICC profile storage unit 305 executes color conversion on the L'*a'*b'* data using the newly created ICC profile to convert the L'*a'*b'* data into a CMYK signal that depends on an output device, and outputs the CMYK signal to the engine control unit 102.

In FIG. 3, the CMM 306 is separated from the input ICC profile storage unit 307 and the output ICC profile storage unit

Figure 4:
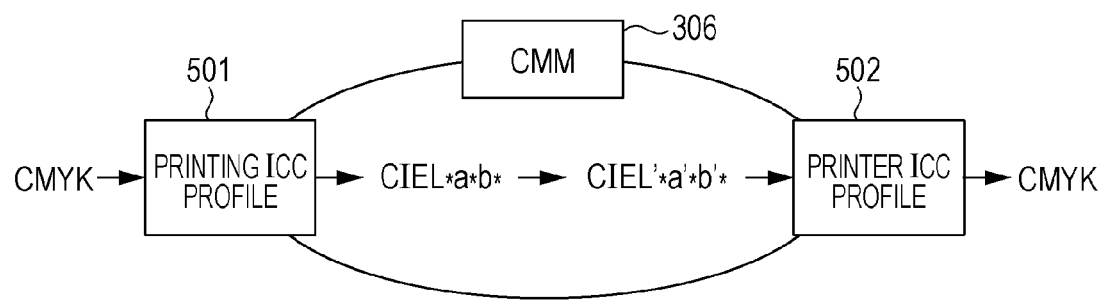
FIG. 4 is a schematic view of a color management environment.

305. However, as illustrated in FIG. 4, the CMM 306 is a module in charge of color management and is a module that executes color conversion using an input profile (printing ICC profile 501) and an output profile (printer ICC profile 502).

(Color Characteristics of Thermochromism)

Figure 5:
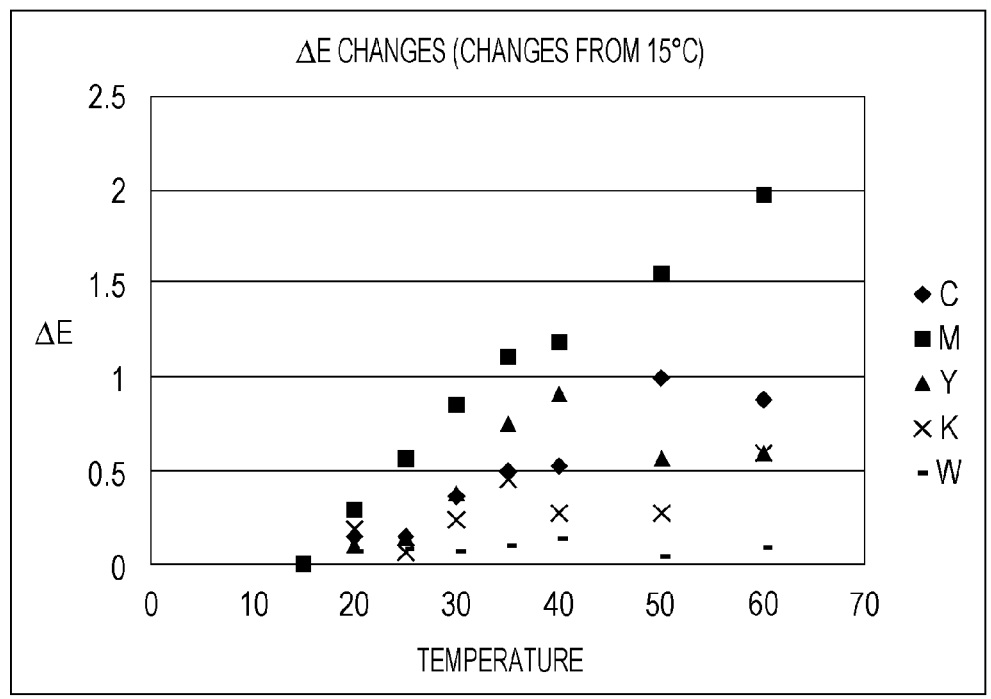
FIG. 5 is a diagram illustrating the inclination of changes in the chromaticity of each color material.

Next, the thermochromism characteristics of each color will be described. When a molecular structure that forms a color material such as toner or ink are changed by heat, the reflection/absorption characteristics relative to light change and accordingly chromaticity changes. As a result of examination through experiments, the inclinations of changes in chromaticity are different between color materials as illustrated in FIG. 5. The horizontal axis in this figure represents the temperature of a patch image, and the vertical axis represents a change ΔE in chromaticity when 15° C. is taken as a reference.

It is to be noted that ΔE can be expressed as a three-dimensional distance between two points (L1, a1, b1) and (L2, a2, b2) in a L*a*b* color space defined by CIE using the following expression.

$$\Delta E = \sqrt{(L1-L2)^2 + (a1-a2)^2 + (b1-b2)^2}$$

In FIG. 5, C: cyan 100%, M: magenta 100%, Y: yellow 100%, K: black 100%, and W: paper white. As illustrated in this figure, especially the thermochromism characteristic of magenta is unsatisfactory.

(Thermochromism Correspondence Technology)

As an index of color matching accuracy and the stability of colors, the average of ΔE is specified to be 4.0 in a color matching accuracy standard (IT8.7/4 (ISO 12642:1617 patch) [4.2.2]) described in ISO 12647-7. In addition, with respect to reproducibility [4.2.3], which is a standard for stability, ΔE of each patch is specified to be smaller than or equal to 1.5. In order to satisfy this condition, the detection accuracy of the color sensor 200 is desirably ΔE≤1.0.

Therefore, in the present embodiment, when the color of a patch image heated by a fixing unit is to be measured by the color sensor 200, chromaticity output from the color sensor 200 is corrected and chromaticity in a normal temperature environment is calculated. In doing so, even if the chromaticity of the patch image changes due to thermochromism, the chromaticity of the patch image can be accurately detected. A process for obtaining this effect will be described hereinafter in detail.

Figure 6:
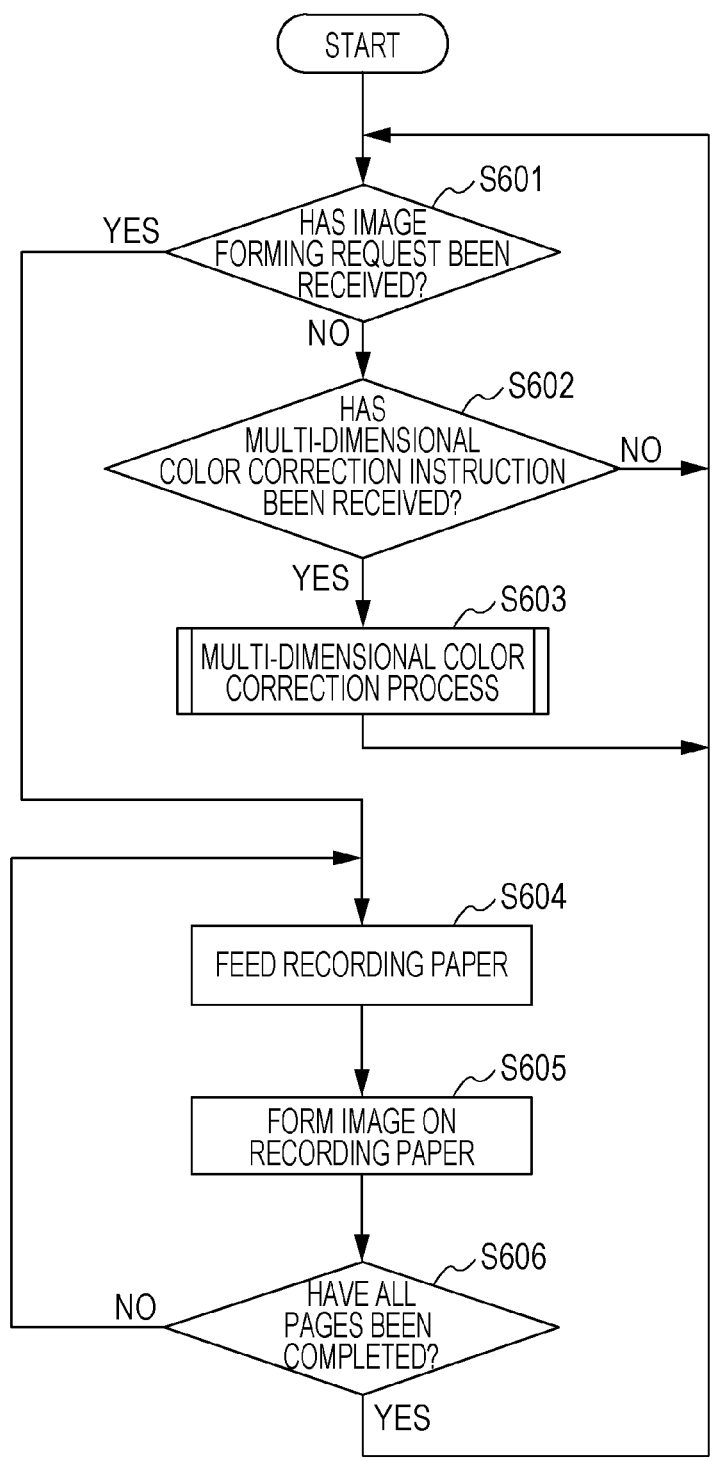
FIG. 6 is a flowchart illustrating the operation of the image forming apparatus 100.

FIG. 6 is a flowchart illustrating the operation of the image forming apparatus 100. This flowchart is executed by the printer controller 103. First, the printer controller 103 judges whether or not an image forming request has been received from the operation unit 180 or whether or not an image forming request has been received from the host computer through the I/F 308 (S601).

Figure 7:
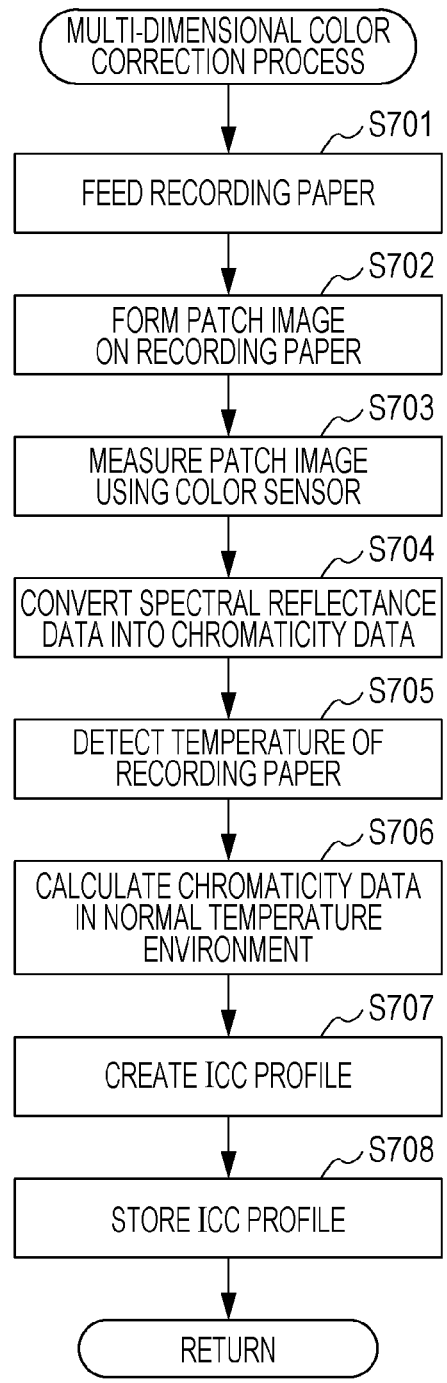
FIG. 7 is a flowchart illustrating a multi-dimensional color correction process.

If an image forming request has not been received, the printer controller 103 judges whether or not a multi-dimensional color correction instruction has been received from the operation unit 180 (S602). If a multi-dimensional color correction instruction has been received, a multi-dimensional color correction process, which will be described later with reference to FIG. 7, is performed (S603). If a multi-dimensional color correction instruction has not been received, the operation returns to step S601.

If it is judged in step S601 that an image forming request has been received, the printer controller 103 feeds the recording paper 110 from the storage tray 113 (S604) and forms a toner image on the recording paper 110 (S605). The printer controller 103 then judges whether or not image formation has been completed for all pages (S606). If image formation has been completed for all the pages, the operation returns to step S601, and if image formation has not been completed for all the pages, the operation returns to step S604 and image formation is performed for a next page.

FIG. 7 is a flowchart illustrating the multi-dimensional color correction process. This flowchart is executed by the printer controller 103. First, the printer controller 103 feeds the recording paper 110 from the storage tray 113 (S701) and forms a patch image on the recording paper 110 (S702). Next, when the recording paper 110 has reached the color sensor 200, the printer controller 103 causes the color sensor 200 to measure the patch image (S703). Here, the color sensor 200 outputs spectral reflectance data regarding the patch image to the printer controller 103.

Next, the printer controller 103 converts the spectral reflectance data into chromaticity data (L*a*b*) (S704). Thereafter, the printer controller 103 causes the temperature sensor 208 to detect a temperature T of the recording paper 110 (S705). The printer controller 103 then calculates chromaticity data (L*a*b*) in a normal temperature environment using the chromaticity data (L*a*b*) obtained as a result of the conversion in step S704 and the temperature T of the recording paper 110 detected in step S705 (S706). Details of the calculation method will be described later.

Next, the printer controller 103 creates an ICC profile using the above-described process on the basis of the chromaticity data (L*a*b*) calculated in step S706 (S707) and stores the ICC profile in the output ICC profile storage unit 305 (S708). Thereafter, the process returns to step S601.

FIG. 8A is a diagram illustrating a conversion table of chromaticity data from 60° C. to 25° C. (normal temperature environment) using direct mapping. FIG. 8B is a diagram illustrating a conversion table for each temperature range. The processing in step S706 will be specifically described with reference to these drawings.

The temperature of the recording paper 110 that has just passed through a fixing unit is high due to heat applied from the fixing unit. In this state, the Lab operation unit 303 calculates chromaticity data (L*a*b*) from a result of the detection of the patch image by the color sensor 200.

Suppose that the temperature of the recording paper 110 at the time of the detection of the patch image by the color sensor 200 is 60° C. In this case, the chromaticity data (L*a*b*) calculated by the Lab operation unit 303 at a temperature of 60° C. has an error relative to chromaticity data (L*a*b*) at a temperature of 25° C., which is a normal temperature environment.

Therefore, the Lab correction unit 320 corrects the chromaticity data (L*a*b*) using the detected temperature T of the temperature sensor 208 to calculate the chromaticity data in the normal temperature environment. More specifically, the Lab correction unit 320 corrects the chromaticity data (L*a*b*) using a conversion table such as that illustrated in FIG. 8A that converts a Lab color space at a temperature of 60° C. into a Lab color space in the normal temperature environment (25° C.) and that uses direct mapping.

It is to be noted that, as illustrated in FIG. 8B, the conversion tables are obtained in advance through experiments for the ranges of the detected temperature T of the temperature sensor 208. The conversion table illustrated in FIG. 8A is ΔT=60. These conversion tables are saved to the storage unit 350. The Lab correction unit 320 reads a conversion table corresponding to the detected temperature T in accordance with a result of the detection by the temperature sensor 208 and uses the conversion table for correction.

Although a conversion method using direct mapping has been described in the present embodiment, the present invention is not limited to this conversion method. For example, calculation adopting a transformation matrix that is used as a general method for correcting a color space may be used.

In addition, although the temperature of the recording paper 110 is detected by the temperature sensor 208 in step S705 according to the present embodiment, the temperature sensor 208 need not be provided in the image forming apparatus 100 and the temperature may be calculated from various conditions under which the image forming operation is performed.

More specifically, the printer controller 103 calculates the temperature of the recording paper 110 at the time of color detection on the basis of the type of the recording paper 110 input from the operation unit 180, a fixing mode, and the like. The fixing mode may be a normal mode that uses only the first fixing unit 150 or a gloss mode that uses both the first fixing unit 150 and the second fixing unit 160. Here, the printer controller 103 calculates the temperature while referring to a temperature calculation table that has been set in advance. The temperature calculation table is illustrated as Table 1 and saved to the storage unit 350 in advance.

TABLE 1

| | | Thin paper | Normal paper | Thick paper 1 | Thick paper 2 |
|---|---|---|---|---|---|
| Fixing mode | Normal mode | 45° C. | 50° C. | 62° C. | 72° C. |
| | Gloss mode | 47° C. | 55° C. | 62° C. | 75° C. |

The Lab correction unit 320 may correct the chromaticity data (L*a*b*) on the basis of a result of calculation of the temperature of the recording paper 110 such that the effect of thermochromism is reduced.

As described above, according to the present embodiment, a thermochromism phenomenon in which the chromaticity of a patch image changes depending on temperature can be suppressed, and therefore the chromaticity of the patch image can be accurately detected.

According to the present invention, it is possible to suppress the effect of a thermochromism phenomenon, which changes the chromaticity of an image whose color is to be measured depending on temperature, and to accurately detect the chromaticity of the image whose color is to be measured.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Patent Application No. PCT/JP2011/073606, filed Oct. 14, 2011, which is hereby incorporated by reference herein in its entirety.

The invention claimed is:

1. An image forming apparatus comprising:
   an image forming unit configured to form a plurality of images whose colors are to be measured on recording paper using color materials;
   a fixing unit configured to fix the plurality of images whose colors are to be measured onto the recording paper by heating the plurality of images;
   a setting unit configured to be able to selectively set a first fixing mode and a second fixing mode in which a heat amount to be applied to the recording paper is larger than that in the first fixing mode;
   a color measurement unit configured to measure the colors of the images fixed onto the recording paper downstream of the fixing unit in a direction in which the recording paper is carried; and
   a correction unit configured to correct results of the measurement of the colors obtained by the color measurement unit based on a fixing mode set by the setting unit in such a way as to suppress an effect of changing color of the images whose colors are to be measured due to heat applied from the fixing unit.

2. The image forming apparatus according to claim 1, further comprising:
   a temperature detection unit configured to detect the temperature of the recording paper,
   wherein the correction unit corrects the results of the measurement of the colors obtained by the color measurement unit on the basis of a result of the detection obtained by the temperature detection unit in such a way as to suppress the effect of changing the color of the images whose colors are to be measured due to the heat applied from the fixing unit.

3. The image forming apparatus according to claim 1, further comprising:
   temperature calculation unit configured to calculate the temperature of the recording paper,
   wherein the correction unit corrects the results of the measurement of the colors obtained by the color measurement unit on the basis of a result of the calculation obtained by the temperature calculation unit in such a way as to suppress the effect of changing the color of the images whose colors are to be measured due to the heat applied from the fixing unit.

4. The image forming apparatus according to claim 3, wherein the temperature calculation unit calculates the temperature of the recording paper on the basis of a type of the recording paper.

5. The image forming apparatus according to claim 3, wherein the fixing unit includes a first fixing unit and a second fixing unit provided downstream of the first fixing unit, and
   wherein the first fixing mode is a mode for using any one of the first fixing unit and the second fixing unit, and the second fixing mode is a mode for using both of the first fixing unit and the second fixing unit.

6. The image forming apparatus according to claim 1, wherein the correction unit corrects the results of the measurement of the colors obtained by the color measurement unit in such a way as to make the results be close to color in a normal temperature environment.

7. The image forming apparatus according to any of claim 1,
   wherein the image forming unit forms the images by transferring toner onto the recording paper, and
   wherein the fixing unit fixes the toner onto the recording paper by heating the toner.

8. The image forming apparatus according to claim 1,
   wherein the image forming unit forms the images on the recording by ejecting ink, and
   wherein the fixing unit dries the ink.

* * * * *